United States Patent [19]
Fergen

[11] Patent Number: 5,385,673
[45] Date of Patent: Jan. 31, 1995

[54] METHOD OF TREATING WASTEWATER BIOSOLIDS

[75] Inventor: Robert E. Fergen, Raleigh, N.C.

[73] Assignee: Hazen and Sawyer, P.C., New York, N.Y.

[21] Appl. No.: 942,144

[22] Filed: Sep. 8, 1992

[51] Int. Cl.$^6$ .............................................. C02F 11/14
[52] U.S. Cl. ................................... 210/710; 210/768; 210/751; 422/28; 422/32; 71/12; 71/13
[58] Field of Search .............. 210/710, 749, 751, 764, 210/768, 609; 422/28, 32; 71/12, 13

[56] References Cited

U.S. PATENT DOCUMENTS

| | | | |
|---|---|---|---|
| 3,915,853 | 10/1975 | Luck | 210/612 |
| 4,028,130 | 6/1977 | Webster et al. | 210/751 |
| 4,119,495 | 10/1978 | Belyaev et al. | 210/609 |
| 4,270,279 | 6/1991 | Roediger | 34/9 |
| 4,306,978 | 12/1981 | Wurtz | 210/751 |
| 4,554,002 | 11/1985 | Nicholson | 71/12 |
| 4,781,842 | 11/1988 | Nicholson | 210/751 |
| 4,902,431 | 2/1990 | Nicholson et al. | 210/751 |
| 4,956,926 | 9/1990 | Glorioso | 34/111 |
| 4,997,572 | 3/1991 | Wurtz | 210/710 |
| 5,013,458 | 5/1991 | Christy | 210/751 |
| 5,051,031 | 9/1991 | Schumacher et al. | 210/751 |
| 5,087,378 | 2/1992 | Kovacs | 210/609 |
| 5,135,664 | 8/1992 | Burnham | 210/751 |

*Primary Examiner*—Neil McCarthy
*Attorney, Agent, or Firm*—Malin, Haley, DiMaggio & Crosby

[57] ABSTRACT

A method of treating wastewater biosolids by destruction of pathogens and indicator organisms to meet or exceed USEPA Process to Further Reduce Pathogens standards. The method first depresses the pH to below 5, followed by pH increase to 12 or higher, causing an exothermic reaction and heat of hydration. The mixture is placed within a confined volume to maintain the temperature at or above 55° C. for at least two hours. The mixture can be dewatered for a higher percent solid characteristic. The material is then tested and if test results indicate, the material is approved by the Environmental Protection Agency for human contact. The biosolid materials are suitable for general nutrient values with minimal regulatory restriction and other beneficial uses.

9 Claims, 6 Drawing Sheets

METHOD OF TREATING WASTEWATER BIOSOLIDS

BACKGROUND OF THE INVENTION

1. Field of the Invention

This invention relates generally to the treatment of wastewater sludge, and more particularly, to a method of treating wastewater residuals and similar organic waste material to produce a material which may be beneficially reused.

2. Description of the Prior Art

The need to treat wastewater sludge is well known in the art together with various methods designed to permit sludge beneficial reuse. Alkaline treatment is one such method and is an effective means for stabilizing sludge by increasing the pH of the sludge to 12 or higher. Typically the use of lime requires stabilization dosages of approximately 0.2 pounds of lime per pound of solids. If the sludge is also subjected to temperatures of 70° C. or over for at least 30 minutes, the result is a complete disinfection commonly referred to as pasteurization resulting in the destruction of pathogens and indicator organisms making the sludge suitable for general plant nutrient supplementation and soil conditioning without a site specific application permit. The Environmental Protection Agency recognizes this type of process as a Process That Further Reduces Pathogens (PFRP) and allows unrestricted contact with biosolids so treated.

When calcium oxide (quicklime or CaO) or magnesium oxide (MgO) is added into sludge, the calcium oxide reacts exothermically with the free water of sludge to create calcium hydroxide (hydrated lime) plus heat. Calcium hydroxide may also continue to react with carbon dioxide in the atmosphere to form calcium carbonate. Although this carbonation reaction is exothermic, the typical heat available is modest due to the slow rate of the reaction.

Either method requires a high dosage of lime to generate a disinfecting heat by the exothermic reaction known as the heat of hydration. In order to achieve pasteurization temperatures of 70° C., typical dosages are one pound of lime per pound of dry solids at a 20% initial solids concentration. The heat of hydration for lime is equivalent to approximately 491 BTU's per pound of lime. Additional chemical heats are available, such as carbon dioxide or the heat of carbonation, which release heat equivalent to approximately 780 BTU's per pound and may be used to reduce the lime requirement.

Numerous patents address the need for stabilization and sterilization. U.S. Pat. No. 4,270,279 issued to Roediger also discloses another method of alkaline stabilization of dewatered sludge by the use of quicklime dust which results in the formation of pellets. The quick lime dust reacts exothermically with the surface of the pellets resulting in a product that can be used as agricultural fertilizer.

U.S. Pat. Nos. 4,306,978 and 4,997,572 issued to Wurtz discloses a method of producing sludge pellets using sludge stabilized by lime by the inclusion of calcium oxide or similar alkaline materials and combinations thereof, with dewatered wastewater sludge cake in a compartmented reactor. The mixture reacting with carbon dioxide providing disinfection, stabilization, and pelletizing of the sludge. Wurtz requires that the dewatered sludge is provided in a sludge cake which is blended with calcium oxide to form sludge particles. The sludge particles are then mixed with calcium oxide to form calcium hydroxide raising the pH of mixture to a range of 11 to 13. The sludge is then placed into a second compartment wherein the reaction of calcium oxide with free water continues to form calcium hydroxide and raises the pH of the mixture to a selected pH. The sludge is finally placed into a third vessel to react with induced calcium hydroxide and carbon dioxide gas forming calcium carbonate to provide the basis for pellet formation.

One problem with the prior art, of which this invention addresses, occurs during the addition of lime as a primary step for purposes of stabilization and/or disinfection. The receipt of wastewater is not a fixed or known variable causing the addition of lime to become an unknown variable. The result is an uninhibited and often costly addition of lime added to the sludge until the desired pH stabilizing occurs. Another problem is the lack of odor control which is not addressed by the prior art. The control of odor directly affects the acceptablilty of a wastewater treatment process.

Thus, what is needed in the treatment of wastewater and unbeknownst to the prior art, is a method of biosolids conditioning at a low pH before the addition of lime and the various benefits that are derived therefrom.

SUMMARY OF THE INVENTION

In accordance with this invention, a method is disclosed that stabilizes the wastewater sludge or other organic material hereafter collectively known as biosolids at a low pH followed by disinfection at a high pH range. The invention provides a novel method of increasing the exothermic reactions utilizing the heat of acid hydration, and/or the heat of neutralization in addition to the heat of base hydration for pasteurization. The result reduces the amount of lime dosage required for the generation of disinfecting heat thereby resulting in a large cost savings by the use of low cost anhydrous acid. The reaction results in the formulation of the crystalline structures which tend to exclude moisture and encourage evaporation and chemical bonding of a certain amount of water to the additives and therefore, an accelerated drying time.

The process further divides the odors of the biosolid into two groups: the acid insolubility and the base insoluble, the division facilitating odor control. By selecting specific acid and base materials, the odors, particularly ammonia, may be chemically bound and therefore, odor control measures may be reduced or avoid odor control requirements.

The biosolids pH is depressed by an acidic material such as mineral or organic acid by mixing a sufficient quantity of acid to depress the pH of the mixture to less than 5. The use of an acidic material having a predetermined nutrient value or crystalline structure in the final product can tailor the final product for a particular use. After a suitable period of time, an alkaline or other basic material is added to the pH depressed mixture in sufficient quantity to raise the mixture to a pH of 12 or more standard units. Because of the elevated temperature and the higher reaction of the acid, the rate of the base reaction will be faster than the typical hydration reaction.

If the acid is sufficiently concentrated, it releases a heat of acid hydration upon initial mixing with the biosolids.

The mixing of the alkaline material results in a temperature increase due to a series of exothermic reactions which release heat in the form of heat of neutralization, and the heat of base hydration. The material is subsequently placed in a confined reactor volume to maintain the temperature of at least 55° C. for one hour. The material may be subsequently dewatered to a higher percent solids either by external heat or material evaporation. The resulting product is a material that is considered safe for human contact, having high nutrient value and reduced contaminant concentrations. The handling characteristics for the finished material extends over a range from 30% to 95% solids with a variety of handling alternatives and physical characteristics.

The pH of 12 or higher is well documented as being effective in the reduction of indicator bacteria as well as viruses. However, this pH alone is not effective in reducing the viable helminth ova. Therefore the temperature of at least 55° C. is required for a minimum of two hours for pasteurization of the helminth ova. This temperature and time condition effectively eliminating the public health concerns associated with viable helminth ova.

It is therefore an objective of the present invention to provide a method for the destruction of pathogens and indicator organisms in wastewater biosolids that meets or exceeds the requirements of Title 40 CFR Part 257 and the guidance documents of Title 40 CFR Part 503 for recovering of wastewater and other biosolids to use as soil conditioner, fertilizer, fuel or the like.

It is another objective of the instant invention is to reduce the cost of biosolids treatment by the conditioning of material at a pH less than 5 standard units before the addition of lime or other basic material.

Yet still another objective of the instant invention is to provide an increased exothermic reactions under the heat of neutralization and the heats of acid and base hydration for the disinfection which reduces the amount of lime dosage required for the generation of heat, resulting in increased cost savings by the use of low cost anhydrous acid.

Yet another objective of the instant invention is to utilize an acidic material having a predetermined nutrient value to enhance the agronomic value of the finished product.

Another objective of the instant invention is the division of odors into two groups, the acid insolubility and the base insolubility which facilitates odor control.

Another objective of the instant invention is the conversion of volatile odoriferous compounds such as ammonia into a nonvolatile compounds such as magnesium ammonia phosphate and di-ammonia phosphate.

Another objective of the instant invention is the rapid processing of the biosolids which process the biosolids into a usable form in as little as two hours, thereby reducing storage requirements and reactor volumes.

Yet another objective of the instant invention is the ability to formulate finished products with a wide range of physical properties and handling characteristics.

Yet another objective of the instant invention is the rapid dewatering of the chemically conditioned biosolids due to crystal formation and exclusion of water from the biosolids with enhanced drying.

Still another objective of the instant invention is the formulation of a time release nutrient source.

Another objective of the instant invention is to produce a biosolid end product that can be used as a soil conditioner, fertilizer supplement, landfill cover material, strip mine reclamation agent, incinerator feedstock and/or stabilization of certain soils.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the instant invention and illustrate various objects and features thereof.

DETAILED DESCRIPTION OF THE EMBODIMENT

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
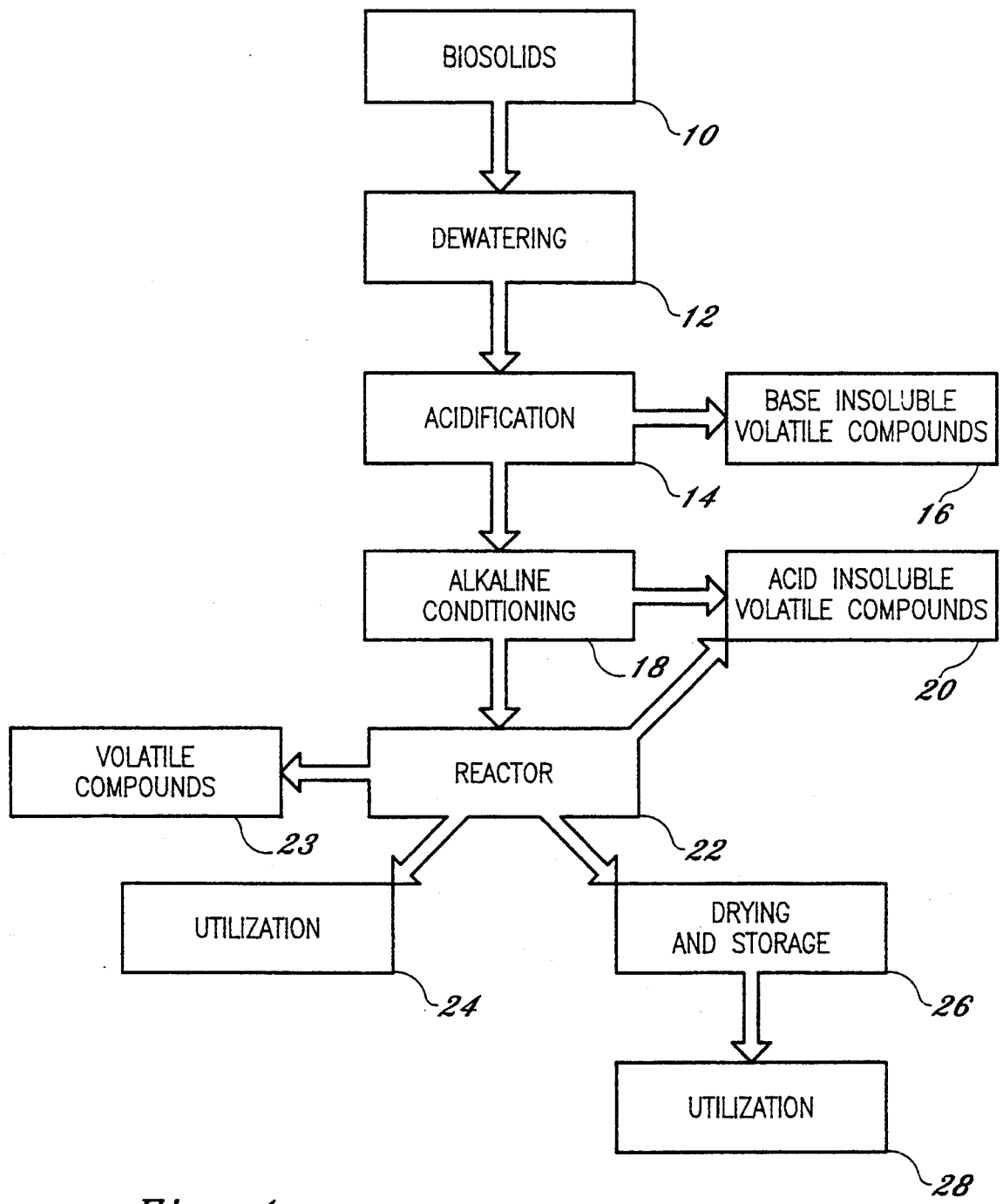
FIG. 1 is a schematic of a first embodiment of the instant invention.

With attention to the drawings and to FIG. 1 in particular, biosolids 10 may contain over 90% water and according to conventional techniques, can be subjected to flocculation and dewatering 12 wherein the mixture is approximately 80% water but may range from less than 40 to over 90 percent water. The remaining solids typically referred to as a wet sludge cake. After dewatering 12, an acidic material 14 such as mineral acid (i.e. phosphoric, nitric, sulfuric, and the like) including waste acids such as pickling acids, or organic acid (such as aliphatic acid and aromatic compounds such as acetic, butyric, propionic, or phenol or any of a group of aromatic hydroxyl derivatives of benzene, polyaromatic compounds and the like, including organic waste acids) or some combination thereof is blended with the biosolid mixture in sufficient quantity to depress the pH of the mixture to below 5 standard units. The acidic pH mixture may be held for a certain period of time so that the reactions may take place. Acid insoluble volatile compounds may be removed 16. The removal of the insoluble volatile compounds at the acidification and alkaline steps allows for the division of odors into two groups, the acid insolubility and base insolubility to facilitate odor control. A certain amount of heat, known as the heat of hydration will be released from the mixing of strongly acidic materials with the biosolids.

The acidic pH mixture is then mixed with a basic material 18 (i.e. calcium oxide, calcium hydroxide, potassium hydroxide, kiln dust, and the like) in sufficient quantity so that the pH increases to 12 or more standard units. Base insoluble volatile compounds may be removed (20). The mixture is then placed within a reactor vessel 22 which may or may not be stirred, wherein the temperature of the mixture increases to above 55° C. due to a series of exothermic reactions. Volatile odoriferous compounds such as ammonia can be converted into a nonvolatile compound such as magnesium ammonia phosphate. The material maintained in the reactor vessel for at least two hours at a temperature above 55° C. and at a pH of at or above 12 standard units. After processing in the reactor vessel, the material can be immediately utilized as a high nutrient value biosolid 24 or aglime potting soil supplement, or it can be dried into pellets 26 and used as a high nutrient pellet mixture 28.

There are three major groups of pathogen organisms of concern in biosolids; viruses, certain bacteria, and helminth ova. The pH of 12 or higher is well documented as being effective in the reduction of indicator bacteria as well as viruses. However, this pH is not effective in reducing the viable helminth ova. Therefore the temperature of at least 55° C. is required for approximately one hour for pasteurization of the helminth ova. This temperature and time condition effectively eliminating the public health concerns with helminth ova.

Figure 2:
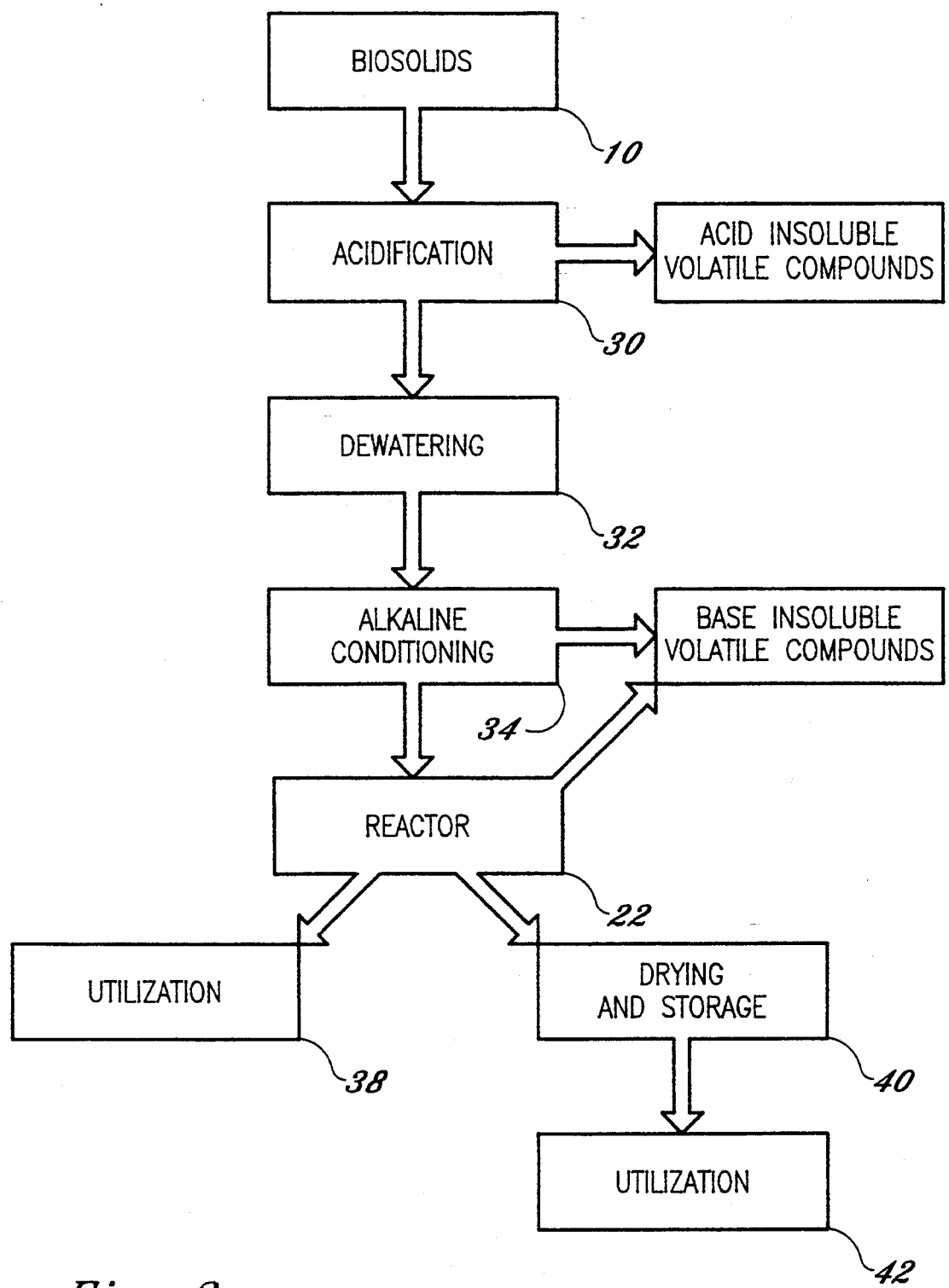
FIG. 2 is a schematic of a second embodiment of the instant invention.

Referring now to FIG. 2, acidification 30 may be added to the biosolids 10 before dewatering 32 by a press or the like mechanical dewatering device. When the pH is stabilized, the mixture is mixed with an alkaline material 34 such as lime in sufficient quantity so that the pH increases to 12 or more standard units. The mixture is then placed within a reactor vessel 36 wherein the temperature of the mixture increases to at or above 55° C. due to a series of exothermic reactions. The material maintained in the reactor vessel 36 for at least two hours at a temperature at or above 55° C. and at or above 12 standard pH units. After processing in the reactor vessel, the material can be utilized as a high nutrient value sludge 38, or it can be dried either by heat or with mechanical aeration into pellets 40 and used as a high nutrient pellet mixture 42.

Stabilization, wherein the biosolids are conditioned with an acid and subsequently mixed with an alkaline material such as lime or selected ashes so that the pH of the mixture is 12 standard units or above, also achieving an elevated temperature. The reaction of the mixture accelerates drying time due to the formulation of the crystalline structures, which tend to exclude moisture, the heat encouraging evaporation and chemical bonding of a certain amount of water to the additives.

Most any organic or mineral acid will suffice, such as anhydrous acid in solid, liquid, or gaseous states. Nitric acid and sulfuric acid are acceptable and provide essential plant nutrients. Phosphoric acid provides a higher nutrient value. A wide variety of organic acids including acetic, butyric, propionic, phenol as well as various food or other processing wastes.

EXAMPLE 1

Significant potential sources of heat are the reaction of strong anhydrous acids with water and the reaction of lime in excess of the requirement for neutralization with phosphoric acid. The typical heat of acid hydration is approximately the same as the heat of base hydration. The estimated heat of the neutralization reaction for this material generated by this reaction is approximately 1,580 BTU's per pound of lime, or three times the value of heat of hydration. Using the phosphoric acid addition followed by lime addition, the lime dosage required to generate heat would be reduced to approximately one-third of the dosage required for heat of hydration only. The overall lime dosage required for a wastewater sludge would decrease from one to a half pound of lime per pound of solids. With the addition of phosphoric acid at 0.5 pounds per 0.26 pounds of lime, and at a cost of $80.00 per ton of lime and $280.00 per ton of phosphoric acid, the following can be set forth by way of example:

The use of lime only for 1,000 pounds of residual material is a cost of $40.00. If 500 pounds of phosphoric acid is $70.00 and 500 pounds of lime is added at $20.00, the result is $90.00. The agronomic value of the phosphate remains the same after reaction with the lime wherein the incremental amount of lime required is $18.00 per 1,000 pounds while the amount of phosphoric acid and lime addition is $70.00 for the phosphoric and $9.00 for the lime, total $79.00. The chemical cost per 1,000 pounds with the lime process would be $40.00–$18.00 or $22.00 per 1,000; With the phosphoric acid and lime process, the net chemical cost would be $90.00–$79.00 or $11.00 per 1,000 pounds. The net chemical cost saving is $29.00 per 1000 pounds of input solids.

In this example, the phosphoric acid further reacts with the ammonia which converts the ammonia into a nonvolatile form of di-ammonium phosphate. Another reaction of ammonia and phosphoric acid in the presence of magnesium is the formation of magnesium ammonium phosphate. The quick neutralization reaction and heat release further allows the lime material to hydrate more quickly. This enhances the heat of hydration of CaO and MgO.

Regrowth of undesirable bacteria is controlled by one or more of the following conditions; high pH, high percent solids, high osmotic pressure, balanced indigenous microflora, reduced organic content, chemical stabilization of the organic material, and/or encapsulization of the organic material in a crystalline structure. The use of the crystalline structure is especially useful where heavy metals are of concern, as the metals are chemically bound within the crystalline structure. The product produced from the method can be used as a soil conditioner, an aglime agent or potting soil component, or a slow/fast release fertilizer supplement nutrient. Alternatively, the end product can be used as a land fill cover material, strip mine reclamation agent, incinerator feedstock, or for stabilization of soils.

Figure 3:
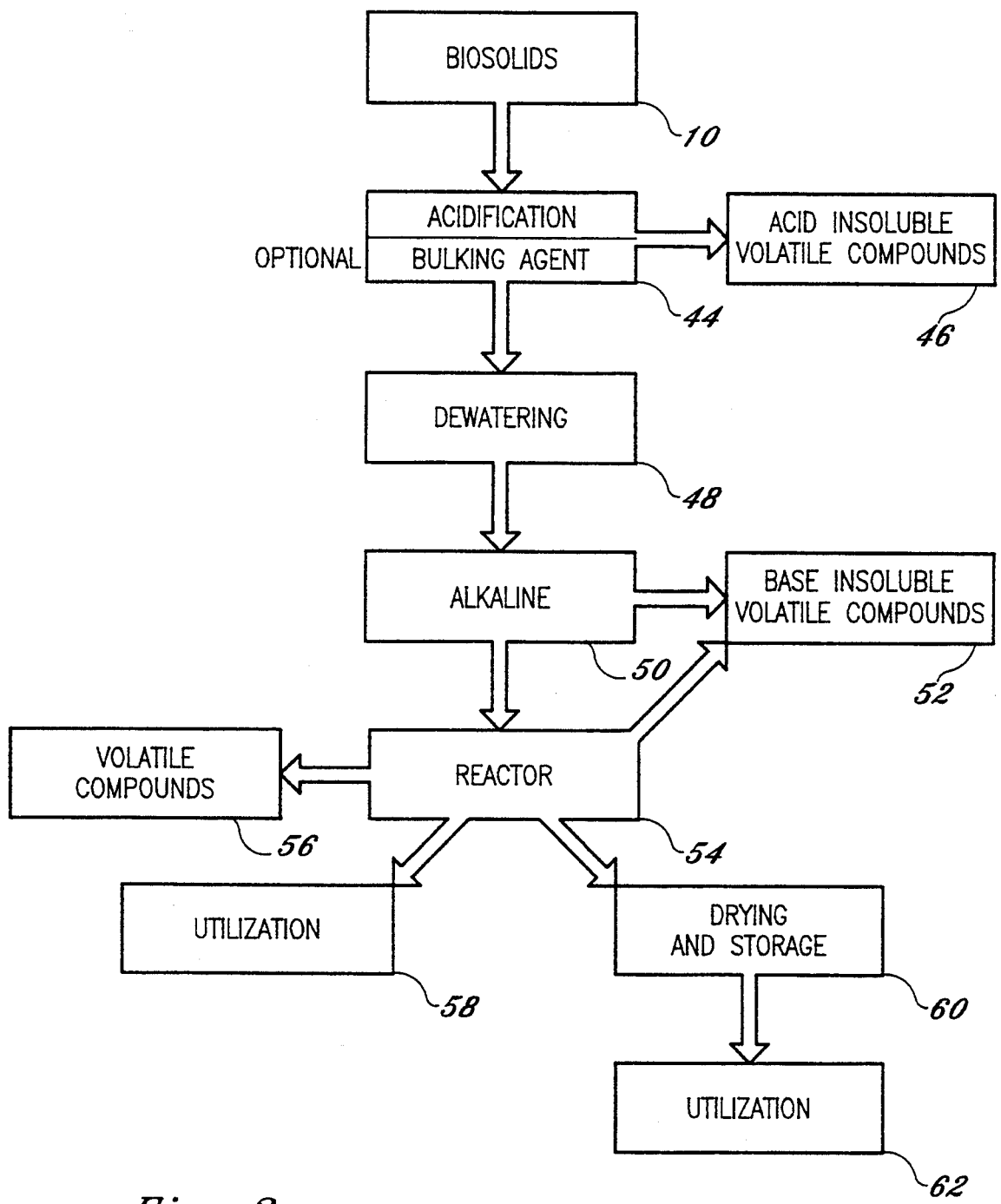
FIG. 3 is a schematic of a third embodiment of the instant invention.

Now referring to FIG. 3, biosolids 10 are mixed with a bulking agent 44 such as gypsum, recycled paper, sugar, or other like processing wastes which provide for pH depression. It should be obvious to one skilled in the art that any form of mixing is acceptable, but in many instances, the use of aeration is preferred to saturate the mixture with oxygen necessary for the exothermic reaction. Acid insoluble volatile compounds 46 can be removed from the mixture before dewatering 48 by a press or the like dewatering type devices. Once the pH is stabilized, the dewatered mixture is presented with an alkaline material 50 such as lime in sufficient quantity so that the pH increases to 12 or more standard units. Base insoluble volatile compounds 52 can be removed from the mixture at this point. The mixture is then placed within a reactor vessel 54 wherein the temperature of the mixture increases to at or above 55° C. due to a series of exothermic reactions. The material is maintained in the reactor vessel 54 for at least two hours at a temperature at or above 55° C. and at or above 12 standard pH units. Volatile compounds 56 can be removed from the reactor vessel. After processing in the reactor vessel 54, the material can be utilized as a high nutrient sludge 58, or it can be dried and stored 60 and later used as a dried sludge 62, typically found in the pellet form.

Figure 4:
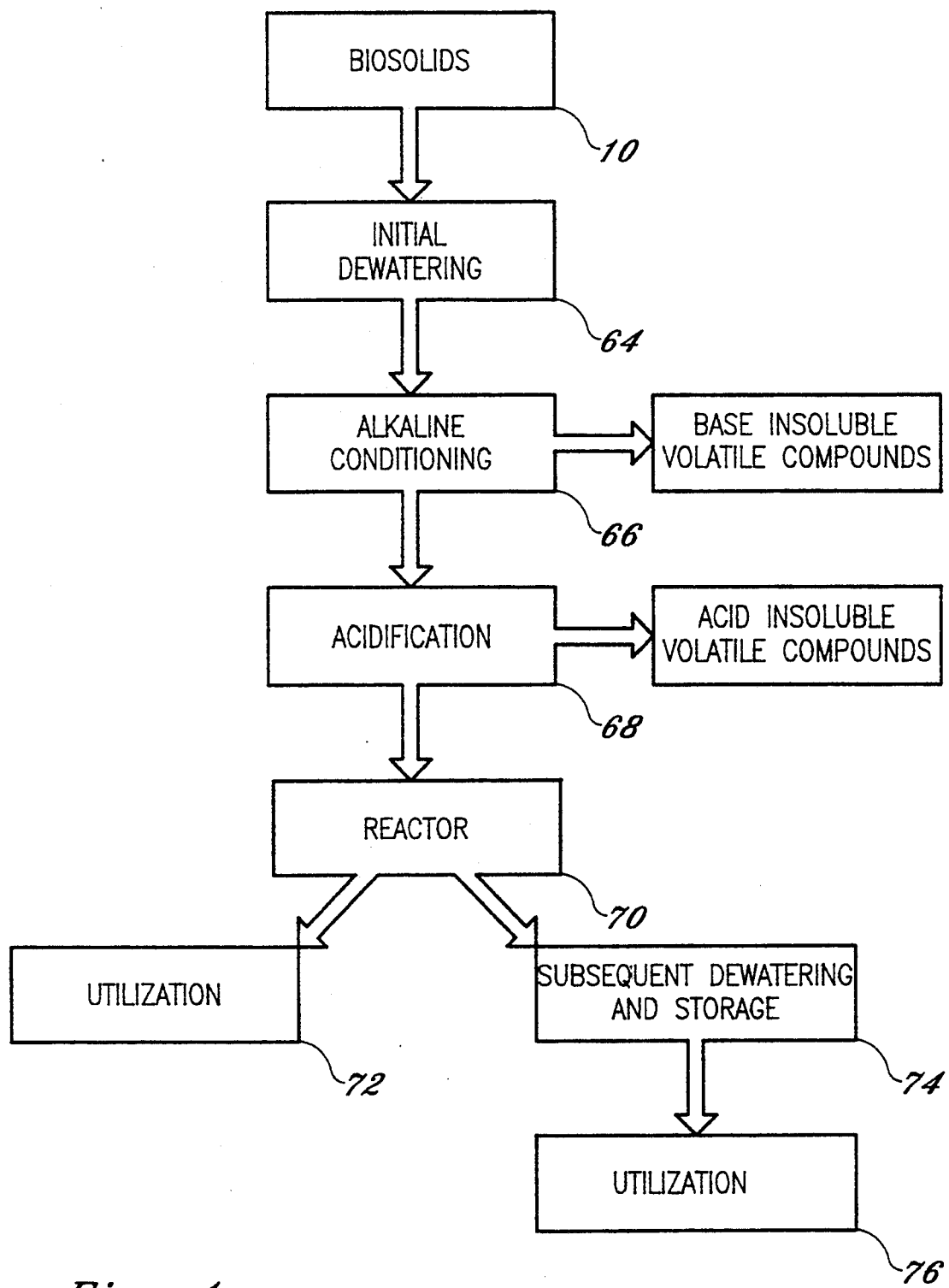
FIG. 4 is a schematic of a fourth embodiment of the invention.

FIG. 4 represents another embodiment of the instant invention, wherein the biosolids 10 are first taken through an initial dewatering 64, followed by an alkaline conditioning 66 which is used to condition the biosolids as dewatered to a predetermined volume. Once stabilized, the alkaline mixture is acidified 68 by the use of mineral acids such as sulfuric, phosphoric, nitric, and/or similar acids including waste acids such as pickling acids. The mixture can then be placed into the reactor vessel 70 for pasteurization purposes before utilization 72 or alternatively, a subsequent dewatering and storage 74 before it is dried or otherwise used in a pellet or the like convenient form 76.

Figure 5:
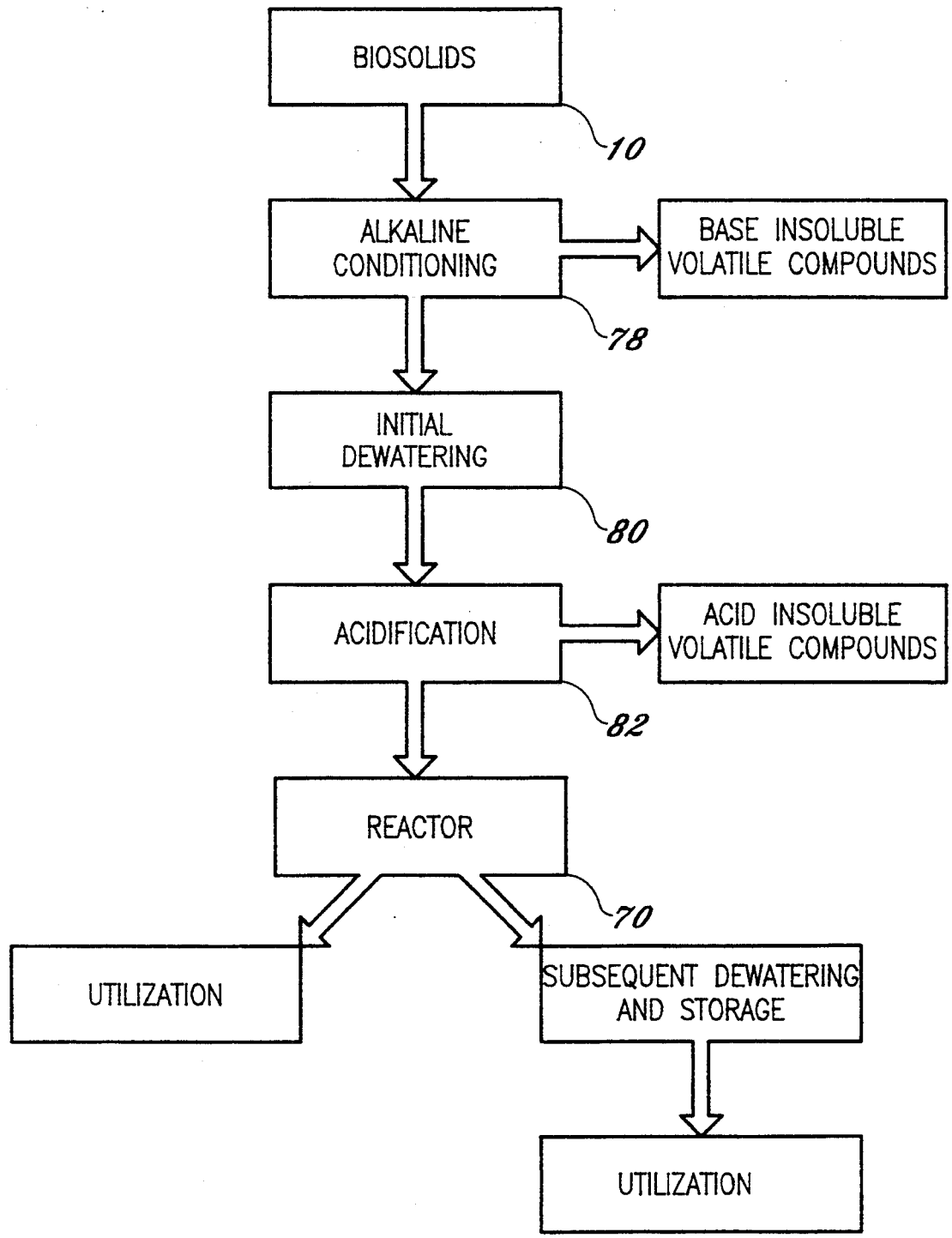
FIG. 5 is a schematic of a fifth embodiment of the invention.

FIG. 5 is an alternative embodiment wherein the biosolids 10 are first conditioned by an alkaline material 78, for instance cement, which increases the exothermic reaction under the heat of neutralization and the heat of hydration for disinfection of biosolids. A bulking agent can be used such as recycled material including gypsum, cardboard, newsprint, flyashes, or similar material, followed by an initial dewatering 80. The acid conditioning 82 provides a means for varying the nutrient value or tailoring the end product. For example, phosphoric acid can be used to provide a higher nutrient value. The mixture is then placed into a reactor 84 for pasteurization purposes as previously described.

Figure 6:
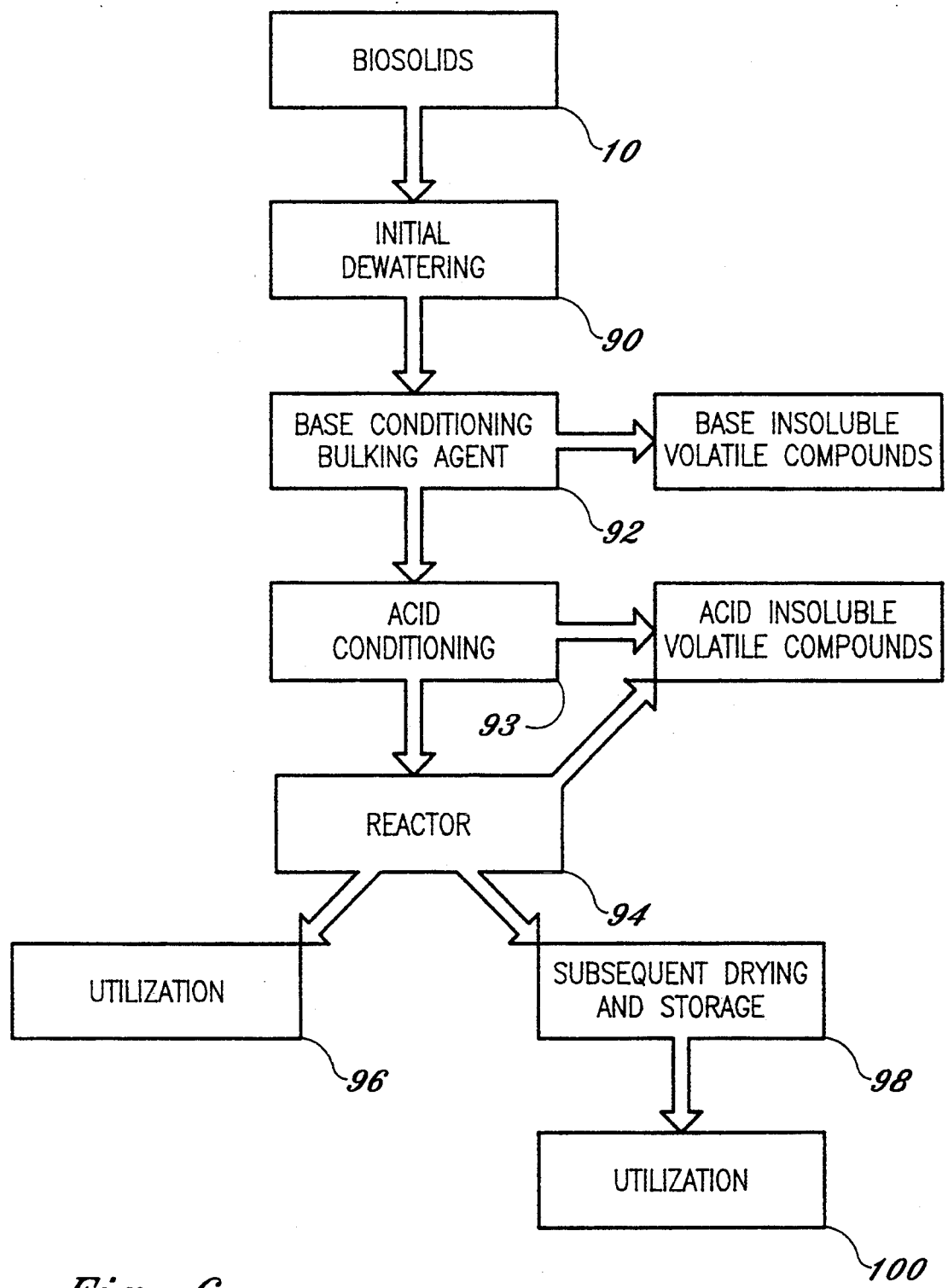
FIG. 6 is a schematic of a sixth embodiment of the invention.

FIG. 6 represents yet another embodiment of the instant invention, wherein the biosolids 10 are first taken through an initial watering 90, followed by a base conditioning bulking agent 92 added thereto. As previously mentioned, the bulking agent may consist of material such as gypsum, recycled paper, or the like processing wastes, to provide for a pH depression, yet providing a stable base. Base insoluble volatile compounds can be removed from the mixture at this point. After the base conditioning of the biosolids, the mixture is then conditioned by the use of acid, which can be used to vary the nutrient value or otherwise tailor the end product. Similar to the aforementioned step of base conditioning, the acid insoluble volatile compounds can be removed at this point, allowing for a removal or elimination of the odors associated with the process. A reactor is then used to maintain the mixture at 55° C. or above for at least two hours, wherein acid insoluble volatile compounds that are produced within the reactor can be removed to control the odor. After the reactor vessel, the material may be directly utilized 96 or it can be dried and stored 98 before final utilization 100.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of sterilizing wastewater sludge for reuse as a fertilizer supplement, as a landfill cover material, and for stabilization of soils, said method comprising the steps of:
   (a) initially dewatering a volume of wastewater sludge until reaching a moisture content in the range of 40% to 90%;
   (b) admixing an acidic material to said wastewater sludge to depress said volume of wastewater sludge to a pH below 5 standard units;
   (c) admixing an alkaline material to said depressed pH volume of wastewater sludge to a pH value of 12 or more standard units;
   (d) placing said volume of wastewater sludge into a closed reactor vessel to maintain said wastewater sludge at a temperature of at least 55° C. for at least two hours; and
   (e) removing said wastewater sludge from said reactor vessel and allowing drying of said wastewater sludge to occur.

2. The method according to claim 1, wherein said acidic material is selected from the group consisting of mineral acids.

3. The method according to claim 2 wherein the mineral acids are selected from the group consisting of sulfuric, phosphoric, nitric, and pickling.

4. The method according to claim 1, wherein said acidic material is selected from the group consisting of organic acids.

5. The method according to claim 4, wherein the organic acids are selected from the group consisting of acetic, butyric, propionic, phenol and aromatic hydroxyl derivatives of benzene and polyaromatic compounds.

6. The method according to claim 1, wherein said acidic material is selected from the group consisting of sugar and grain processing waste.

7. The method of treating wastewater sludge according to claim 1 including the step of admixing recycled material from the group of materials consisting of gypsum, cardboard, newsprint and flyashes during the admixing of an acidic material to said wastewater sludge.

8. The method of sterilizing wastewater sludge according to claim 1 wherein first and second different odors produced through admixing an acidic material to said wastewater sludge and admixing an alkaline material to said wastewater sludge, respectively, are separated, and separately treated.

9. The method of sterilizing wastewater sludge according to claim 1 including initially dewatering said wastewater sludge by precipitation and agitation.

* * * * *

Disclaimer

5,385,673 — Robert E. Fergen, Raleigh, N.C; METHOD OF TREATING WASTEWATER BIOSOLIDS. Patent dated Jan. 31, 1995. Disclaimer filed Dec. 17, 2004, by the Assignee, Hazen & Sawyer, P.C. Engineers.
Hereby enters this disclaimer to claims 1-9, of said patent.

*(Official Gazette May 10, 2005)*